(12) United States Patent
Barker

(10) Patent No.: US 9,639,781 B2
(45) Date of Patent: May 2, 2017

(54) SYSTEMS AND METHODS FOR CLASSIFICATION AND ALIGNMENT OF HIGHLY SIMILAR OR SELF-SIMILAR PATTERNS

(71) Applicant: Cognex Corporation, Natick, MA (US)

(72) Inventor: Simon Barker, Sudbury, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/683,948

(22) Filed: Apr. 10, 2015

(65) Prior Publication Data

US 2016/0300125 A1  Oct. 13, 2016

(51) Int. Cl.
G06K 9/00 (2006.01)
G06K 9/62 (2006.01)
G06T 7/00 (2017.01)

(52) U.S. Cl.
CPC ......... *G06K 9/6256* (2013.01); *G06K 9/6201* (2013.01); *G06T 7/0004* (2013.01)

(58) Field of Classification Search
CPC .... G06T 7/0004; G06K 9/6201; G06K 9/6256
USPC ............... 382/141, 151, 152, 159, 224, 294
See application file for complete search history.

(56) References Cited

U.S. PATENT DOCUMENTS

| | | | |
|---|---|---|---|
| 6,421,458 B2 * | 7/2002 | Michael | G06K 9/00 382/151 |
| 6,658,145 B1 | 12/2003 | Silver et al. | |
| 6,804,416 B1 * | 10/2004 | Bachelder | G06K 9/6253 345/651 |
| 7,016,539 B1 | 3/2006 | Silver et al. | |
| 8,315,457 B2 | 11/2012 | Bogan et al. | |

\* cited by examiner

*Primary Examiner* — Daniel Mariam

(57) ABSTRACT

Systems and methods for training a machine vision system create geometric models. The disclosed methods can extract one or more corresponding features and one or more differentiating features from different sets of training images. The one or more differentiating features can be used to differentiate between the different work pieces. The disclosed methods can generate an alignment model using the corresponding features and a classification model using the one or more differentiating features.

18 Claims, 15 Drawing Sheets

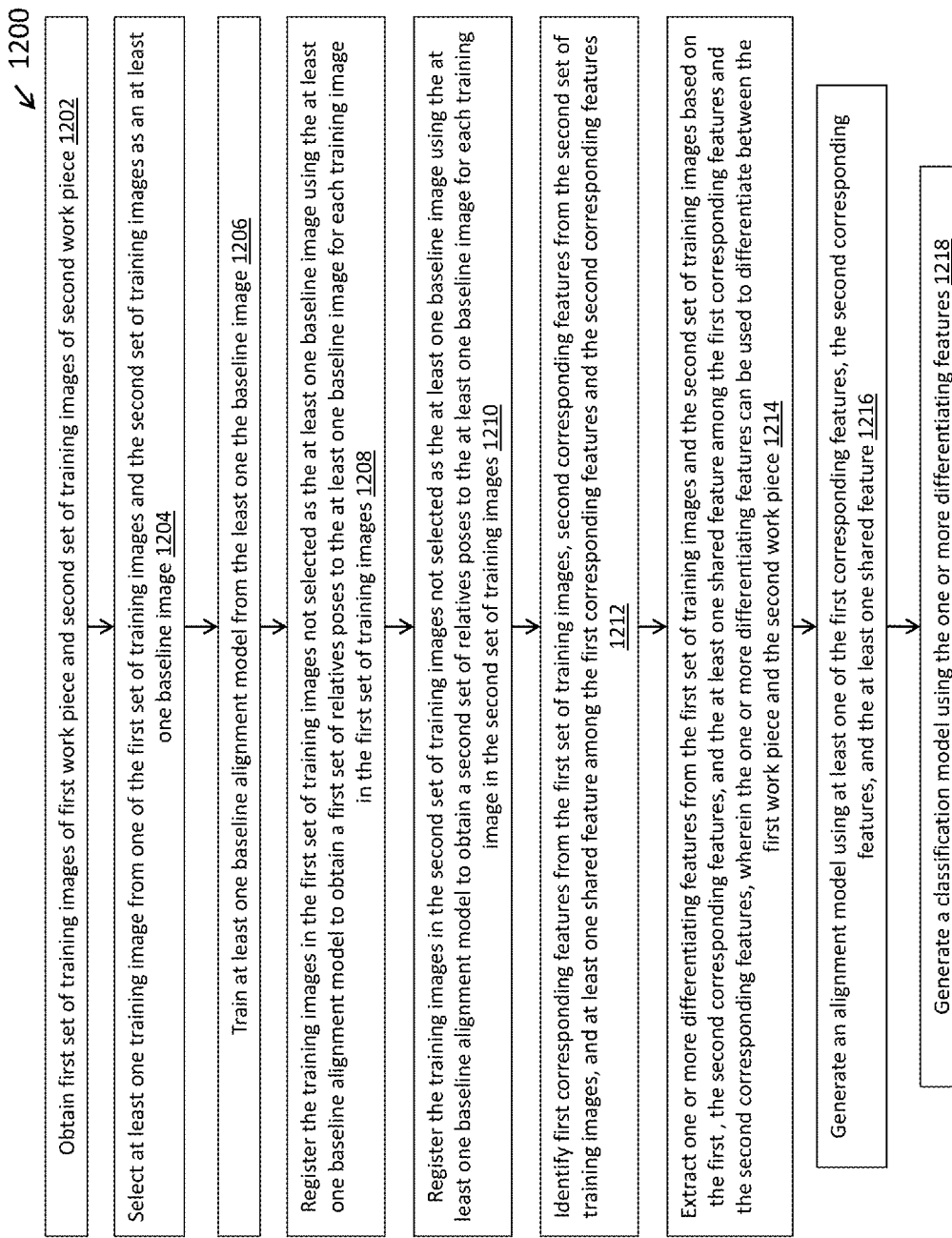

SYSTEMS AND METHODS FOR CLASSIFICATION AND ALIGNMENT OF HIGHLY SIMILAR OR SELF-SIMILAR PATTERNS

FIELD OF THE INVENTION

The present invention relates to classification and alignment of highly similar or self-similar patterns.

BACKGROUND OF THE INVENTION

Advanced machine vision systems are increasingly employed in a variety of manufacturing and quality control processes. Machine vision enables quick, accurate, and repeatable results to be obtained in the production of mass-produced and custom products. Typical machine vision systems can include one or more cameras, having, for example, solid-state charge couple device (CCD) imaging elements, that can be directed at an area of interest, image processing elements that can capture and transmit images, a computer for running the machine vision software application and being capable of processing the captured images, and apparatus for appropriately illuminating the area of interest.

Machine vision applications can involve the inspection of components and their surfaces to identify defects that can affect quality. Where sufficiently serious defects are identified, a part of a surface can be marked as defective or even unacceptable. Typically, advanced machine vision systems acquire an image of a pattern via a camera and analyze the outline or a particular part of the pattern, such as a predetermined mark. Machine vision systems, such as the PatMax® product available from Cognex Corporation of Natick, Mass., can process a large number of real time calculations performed in a short time frame. This particularly enables determining the coordinates within an image reference system for each analyzed point in the viewed area, and correlating these through repetition with a desired pattern. Machine vision systems can map the locations of various points in the captured image to stored points in a model image, and determine whether the captured image points fall within an acceptable range of values relative to the model image points. In addition, using various decision algorithms, a system can decide whether the viewed pattern, in a particular rotation, scale, and pose corresponds to a desired search pattern. In that case, the system can confirm that the viewed pattern is, in fact, the pattern for which the system is searching for and can perform specific tasks, for example, fix the pattern's position and orientation, pick objects from or sort objects in an assembly line, and count objects in the assembly line.

Prior art techniques for registering a pattern often provide incorrect registration of consistent features, i.e., features that appear consistently in all images taken of a particular view. This may be due to variations in location of the feature, changes in lighting conditions, etc. In addition, prior art techniques cannot provide registration of differentiating features that appear in images that correspond to similar objects. What is needed is a technique to enable the training of a machine vision system to detect consistent and differentiating features under high degrees of variability.

SUMMARY

Methods and systems are provided for the classification and alignment of highly similar or self-similar patterns. A self-similar pattern is a pattern that has a similar appearance under at least one two-dimensional transformation. The disclosed methods extract one or more differentiating features from training images that can be used to differentiate between two work pieces.

In some aspects a computerized method for training a machine vision system to create geometric models is provided. The method can include obtaining a first set of training images of a first work piece and a second set of training images of a second work piece, selecting at least one training image from one of the first set of training images and the second set of training images as an at least one baseline image, and training at least one baseline alignment model from the least one the baseline image. The method can also include registering the training images in the first set of training images not selected as the at least one baseline image using the at least one baseline alignment model to obtain a first set of relatives poses to the at least one baseline image for each training image in the first set of training images and registering the training images in the second set of training images not selected as the at least one baseline image using the at least one baseline alignment model to obtain a second set of relatives poses to the at least one baseline image for each training image in the second set of training images. The method can also include identifying first corresponding features from the first set of training images, the second corresponding features from the second set of training images, and at least one shared feature among the first corresponding features and the second corresponding features. The method can also include extracting one or more differentiating features from the first set of training images and the second set of training images based on the first, the second corresponding features, and the at least one shared feature among the first corresponding features and the second corresponding features, wherein the one or more differentiating features can be used to differentiate between the first work piece and the second work piece, generating an alignment model using at least one of the first corresponding features, the second corresponding features, and the at least one shared feature, and generating a classification model using the one or more differentiating features.

In some aspects a computerized method for training a machine vision system to create geometric models is provided. The method can include obtaining a set of training images depicting a pattern, training a baseline alignment model from a first training image of the set of training images, and registering training images of the set of training images other than the first training image to obtain a first set of relative poses among the training images using the alignment model. The method can also include identifying common features from the training images by extracting features from each of the training images, mapping the extracted features using the first set of relative poses and applying to the mapped features a correspondence metric, and generating an alignment model for the pattern using a first subset of the common features derived from a first set of training images that fall in a first region of the pattern. The method can also include identifying a second region within the training images, identifying a second subset of common features derived from a second set of training images that fall in the second region, extracting one or more differentiating features from the first set of common features and the second set of common features, wherein the one or more differentiating features can be used to differentiate between a region containing a fiducial and the second region, and generating a classification model from the one or more differentiating features.

In some aspects, a system for training a machine vision system to create geometric models is provided. The system can include a camera configured to capture images and a processor in communication with the camera. The processor can be configured to obtain a first set of training images of a first work piece and a second set of training images of a second work piece, select at least one training image from one of the first set of training images and the second set of training images as an at least one baseline image, and train at least one baseline alignment model from the least one the baseline image. The processor can also be configured to register the training images in the first set of training images not selected as the at least one baseline image using the at least one baseline alignment model to obtain a first set of relatives poses to the at least one baseline image for each training image in the first set of training images and register the training images in the second set of training images not selected as the at least one baseline image using the at least one baseline alignment model to obtain a second set of relatives poses to the at least one baseline image for each training image in the second set of training images. The processor can also be configured to identify first corresponding features from the first set of training images, identify second corresponding features from the second set of training images, identify at least one shared feature among the first corresponding features and the second corresponding features. The processor can also be configured to extract one or more differentiating features from the first set of training images and the second set of training images based on the first, the second corresponding features, and the at least one shared feature among the first corresponding features and the second corresponding features, wherein the one or more differentiating features can be used to differentiate between the first work piece and the second work piece, generate an alignment model using at least one of the first corresponding features, the second corresponding features, and the at least one shared feature, and generate a classification model using the one or more differentiating features.

In some aspects, a system for training a machine vision system to create geometric models is provided. The system can include a camera configured to capture images and a processor in communication with the camera. The processor can be configured to obtain a set of training images depicting a pattern, train a baseline alignment model from a first training image of the set of training images, and register training images of the set of training images other than the first training image to obtain a first set of relative poses among the training images using the alignment model. The processor can also be configured to identify common features from the training images by extracting features from each of the training images, mapping the extracted features using the first set of relative poses and applying to the mapped features a correspondence metric, and generate an alignment model for the pattern using a first subset of the common features derived from a first set of training images that fall in a first region of the pattern. The processor can also be configured to identify a second region within the training images, identify a second subset of common features derived from a second set of training images that fall in the second region, extract one or more differentiating features from the first set of common features and the second set of common features, wherein the one or more differentiating features can be used to differentiate between a region containing a fiducial and the second region, and generate a classification model from the one or more differentiating features.

These and other embodiments will be described in greater detail in the remainder of the specification referring to the drawings.

BRIEF DESCRIPTION OF THE DRAWINGS

FIG. 12 shows an exemplary method for training a machine vision system, in accordance with some embodiments.

DETAILED DESCRIPTION

Figure 1:
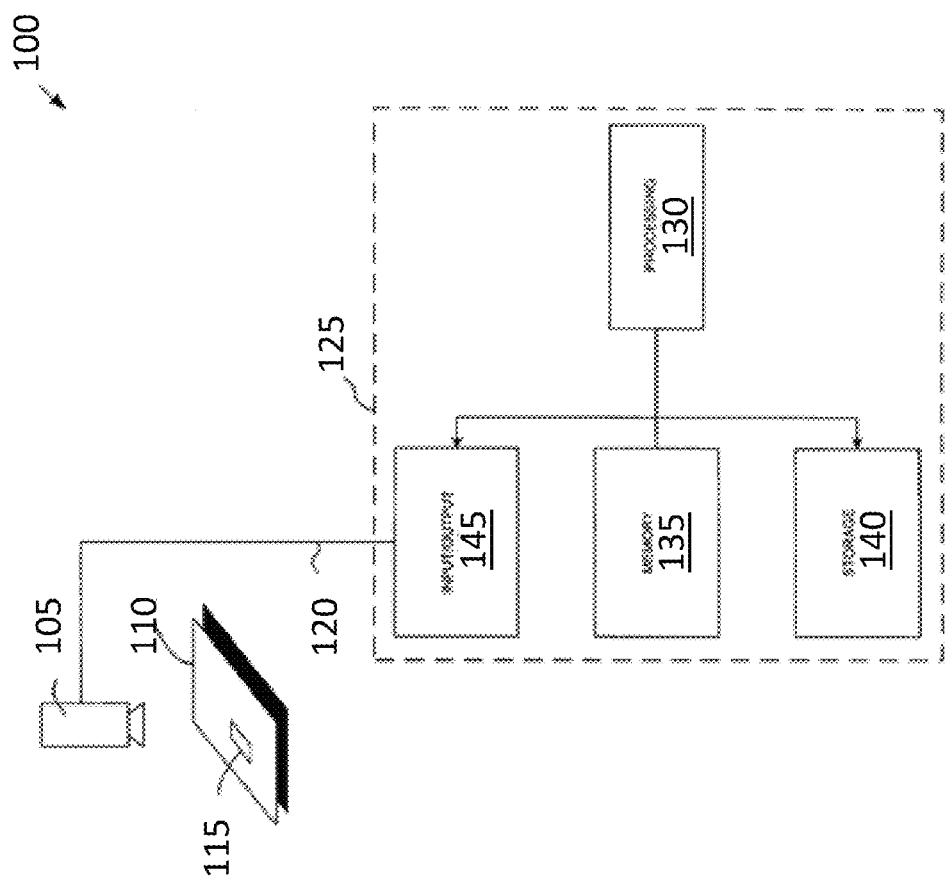
FIG. 1 shows an exemplary machine vision system, in accordance with some embodiments.

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

One disadvantage of typical machine vision systems is that they typically perform training operations using a single training image. As industrial processes often exhibit a high degree of variability, choosing a single training image can potentially bias the pattern and/or model towards the variations that appear in the particular single training image. Variations may include, for example, changes in lighting conditions and/or direction of light sources, small changes in perspective ("plane wobble"), background noise, rotation and/or translation of features within the image, etc. As noted, by utilizing a single training image, any of these variables that are included in the training image may cause a bias in the pattern utilized by the machine vision system for identifying features during run time. For example, should the single training image include a poor representation of one feature, the trained model would incorporate a bias towards images that include similar poor representations of that feature. This may result in false negatives, e.g., decisions by the machine vision system that a feature is not present when, in fact, it is present in an image.

An approach to avoid the noted disadvantages of using single image training is to utilize a plurality of training images and to perform image averaging to generate an averaged training image. In such systems, a plurality of images is taken and an average of each pixel is calculated to generate the averaged training image. A noted disadvantage of such averaging techniques is that edges within the averaged training image may be blurred by the averaging operation. Additionally, erroneous features within the image that only appear in certain images may not be fully removed. For example, if an image contains a very bright erroneous feature in a first training image and not in a second training image, the average training image will contain a medium brightness feature. However, this feature is still erroneous as compared to the desired training image. Additionally, performing the averaging of the training images necessitates extremely precise alignment of the individual images in the average.

Methods and systems are provided for the classification and alignment of highly similar or self-similar patterns. As discussed above, a self-similar pattern is a pattern that has a similar appearance under at least one two-dimensional transformation. For example, a square with a small indentation on one side has a similar appearance when rotated by 90, 180, and 270 degrees.

FIG. 1 is an exemplary block diagram of a machine vision system 100. The machine vision system 100 can include a capturing device 105, for example, a camera or scanner, that can generate an image of an object 110 having one or more features 115. The capturing device may also include a charge coupled device (CCD) or other system for obtaining appropriate image information, such as CMOS sensors. Image data (or pixels) generated by the capturing device 105 can represent an image intensity, for example, color or brightness of each point in the scene within the resolution of the capturing device 105. The capturing device 105 can transmit a digital image data via a communications path 120 to an image analysis system 125. The image analysis system 125 can comprise a conventional digital data processor, such as the vision processing systems of the type commercially available from, for example, Cognex Corporation. The image analysis system 125 can also comprise a conventional microcomputer or other exemplary computing devices. Other forms of interfaces may be utilized, including, e.g., a tablet, a smartphone, personal digital assistants (PDAs), and/or other interfaces. According to aspects of the disclosure, the capturing device 105 can include processing capabilities to perform the functions of the image analysis system 125. In such embodiments, there is not a need for a separate image analysis system. In further alternative embodiments, a capturing device may be operatively interconnected with an image analysis system for training purposes. Once training has completed, an appropriate model or models may be stored in the capturing device for use during run time.

The image analysis system 125 can be programmed in accordance with the teachings of the present disclosure to identify similar and distinctive features among a plurality of images to generate appropriate recognition and registration information for training a machine vision system. The image analysis system 125 may have one or more central processing units (processors) 130, main memory 135, input/output systems 145, and one or more disk drives or other form of mass storage 140. Illustratively, the input/output system 145 interconnects with the communications path 120 between the capturing device 105 and the image analysis system 125. The image analysis system 125 can be configured by programming instructions in accordance with the teachings of the present invention to perform the novel multi-image trained pattern recognition and registration of the present invention. Alternative hardware and/or software configurations can be utilized to implement the principles of the present invention. Specifically, the teachings of the present invention can be implemented in software, hardware, firmware, and/or any combination thereof. Furthermore, during run-time, as opposed to training time, additional components can be included in the machine vision system 100, for example, a conveyor belt or other assembly line apparatus.

In accordance with an illustrative embodiment of the present invention, the machine vision system 100 can be utilized to generate the training model for a run-time machine vision system. Thus, the machine vision system 100 can be utilized to generate a training model that can be utilized in a plurality of machine vision systems utilizing similar components.

Persons skilled in the art would understand that while the present invention is described in terms of a machine vision system 100, the principles of the present invention may be utilized in a variety of differing embodiments. As such, the term machine vision system can include alternative systems. More generally, the principles of the present invention may be implemented on any system that registers sub-patterns in images. For example, one embodiment may involve a conventional machine vision system comprising a standalone camera operatively interconnected with a standalone computer programmed to process images, etc. However, the principles of the present invention may be utilized in other devices and/or systems that register sub-patterns in images. For example, a vision sensor, such as the "Checker" product available from Cognex Corporation, or other device that comprises illumination sources, image acquisition capabilities and/or processing capabilities. Such vision sensors can be trained and/or configured via separate modules, such as a Cognex Vision View. In such embodiments, the user can train the vision sensor using a plurality of parts, instead of a single part. The user can select a first part, place it in front of the sensor and indicate to the system that the training part is positioned.

Additional parts can be similarly trained. The user can control the training step using, e.g., a graphical user interface (GUI) and/or buttons or other control surfaces located on either the training module and/or the vision sensor itself. Furthermore, the functionality of the present invention can be incorporated into handheld devices, wireless compatible devices, etc. Accordingly, the term machine vision system should be interpreted broadly to encompass all such systems and devices that may utilize one or more of the teachings of the present invention.

Multi-Image Registration

According to aspects of the disclosure, systems and methods for performing multi-image training for pattern recognition and registration are provided. In accordance with an illustrative embodiment of the present invention, a machine vision system first obtains N training images of the scene. Illustratively, each of the "N" images contains variations from each other. One of the N images can be selected as a baseline image and the other N−1 images are then registered to the selected image. This registration functions as a "coarse" alignment of each of the images with the selected baseline image, which can require that the other images are translated and/or rotated so that the images are appropriately registered. A person skilled in the art would understand that the registration does not require the same precision as required by prior art averaging techniques.

In some embodiments, the selection and registration steps can be iterated so that a plurality of the N images are utilized as the baseline image. For example, by iterating each of the N images as a baseline image, the system can build a database of corresponding image features that can be used to build a model of features that are stable among the images. For example, for a particular location tolerance, angle tolerance, image fraction, a feature can be stable among a set of images, if it can be found in over a threshold number of image fractions. A feature can be considered found in an image fraction, if, for example, the center of the features is within a location tolerance and the orientation of the feature is within an angle tolerance.

The features that represent a set of corresponding image features can be added to the model. To build the database of corresponding image features, each of the features may be corresponded using a boundary inspection tool or other conventional techniques to correspond contours in machine vision systems. For example, features that are selected for the model can be the features that minimize the maximum distance among the corresponding features in each of the images in which the feature appears. The feature to be added to the model may comprise an average of the features from each of the images in which the feature appears.

The process can continue until each feature that satisfies a threshold requirement is added as a feature corresponding to the model. For example, thresholds can include a location tolerance of two pixels, an angle tolerance of ten degrees, and an image fraction of 0.75. By utilizing a user-defined threshold, the user can determine the desired level of consistency among images for a feature to be incorporated into the training model for the machine vision system. The resulting model can represent the stable features that are found in at least a threshold number of the N training images, for example an image fraction of 0.75. The model can then be used to train an alignment/inspection tool based on the set of features.

Figure 2:
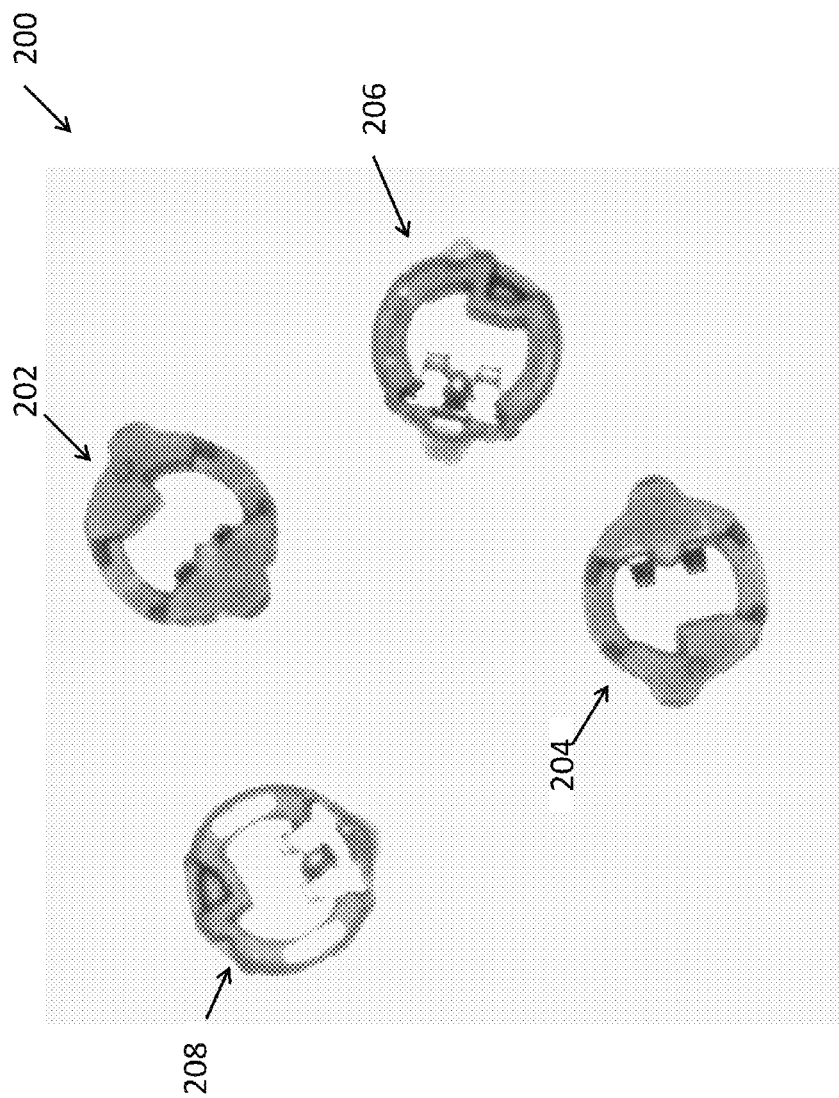
FIG. 2 shows an exemplary field of view in a machine vision system.

In addition to identifying stable features for a single pattern in several training images, in some embodiments it may be desirable to identify variations between similar but different patterns. Using typical machine vision systems to differentiate between two similar patterns can be rather problematic. For example, FIG. 2 shows an exemplary field of view 200 of a machine vision system. The particular field of view shows four shunt rings (202, 204, 206, and 208) of the same type. Typical machine vision systems can have problems determining under which side, e.g., top or bottom, the shunt rings are laid. Specifically, shunt rings 202 and 204 are laid on their top side, while shunt rings 206 and 208 are laid on their bottom side. The shunt rings shown in FIG. 2 have some stable features and they also have some differentiating features. The side, orientation, and generally pose of the shunt rings, and generally of similar parts that have differentiating features often makes it particularly hard for machine vision systems to determine that parts in a field of view correspond to a particular type of parts.

Figure 3A:
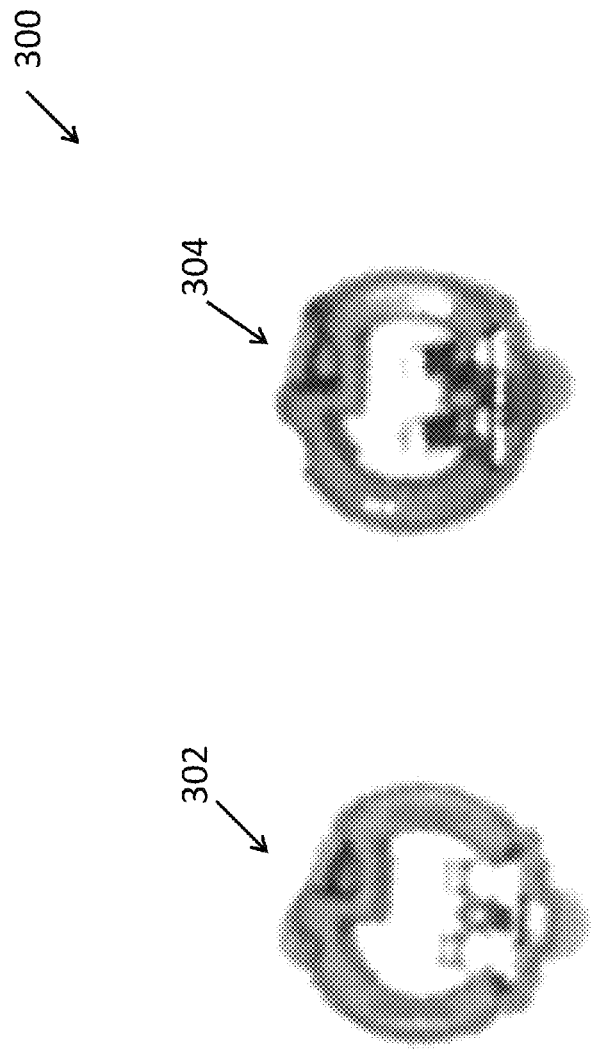
FIG. 3a shows exemplary fields of view of a work piece in a machine vision system.

An added complication can be that different instances of a part can have significant variations in their features, even when the two instances are in the same pose and they are observed in the same way by the machine vision system. This is illustrated in FIG. 3a, which shows, generally at 300, images of two shunt rings (302 and 304) in the same pose. It is clear that, although the images correspond to different instances of the same part, the two images show significantly differentiating features. In other instances, two parts that share common features may have a lot of differentiating features, and therefore, they can correspond to different types of parts. Good alignment models for the top and bottom views can both score highly when aligned against run-time images showing either top or bottom views of the part, because the top and bottom views can share a majority of features. According to embodiments, to discriminate between the top and bottom views, run-time images can be rescored at the found pose with a pair of models trained on the features that differentiate the top view from the bottom view, and, vice versa, the bottom view from the top view, respectively. These "differentiating models" cannot be used for alignment because their likely small number of features will not yield a highly accurate estimate of pose, and search algorithms based around models trained on a low number of features are unlikely to be robust.

Accordingly, it is desirable to have machine vision systems that can identify differentiating features for each different view of a part. Furthermore it is also desirable for the vision system to use multiple images of each view of a part to identify differentiating features. According to aspects of the present disclosure, a machine vision system is trained to extract differentiating features between two or more different sets of training images. The system can be trained to tolerate differences, for example, determine that instances of objects with significant variations or differentiating features that correspond to objects of the same type. The system can be further trained to highlight differences between different objects that also share some common features. A person of ordinary skill would understand that an "object" can encompass a wide variety of things, such as, articles, items, gadgets, entities, characters. For example, the disclosed systems and methods can identify differentiating features of two similar characters, such as, the letter "B" and the number "8." For illustrating purposes only, according to aspects of the present disclosure, the disclosed methods and systems can be used for character recognition. In the particular example of "Bs" and "8s," the system could first identify common features between the two characters, thereby identifying characters that are either "Bs" or "8s." Then the system could identify differentiating features between the two characters, thereby differentiating them and classifying the characters accordingly. For example, to differentiate a "B" from an "8," the model can identify 90 degree angles. Similarly, to differentiate an "8" from a "B," the model can identify 45 degree lines to the left of the central x, which is formed in the center of the 8. One exemplary system for accurately identifying and classifying B's and 8's can train two models: one for the complete "B" character and one for the complete "8" character. The system would run both models to get two poses. At the "8" character's pose, the model would score the differential model trained to differentiate an '8' from a 'B.' At the "B"

character's pose, the model would score the differential model trained to differentiate a 'B' from an '8,' for example, the model with the 90 degree angles.

Figure 3B:
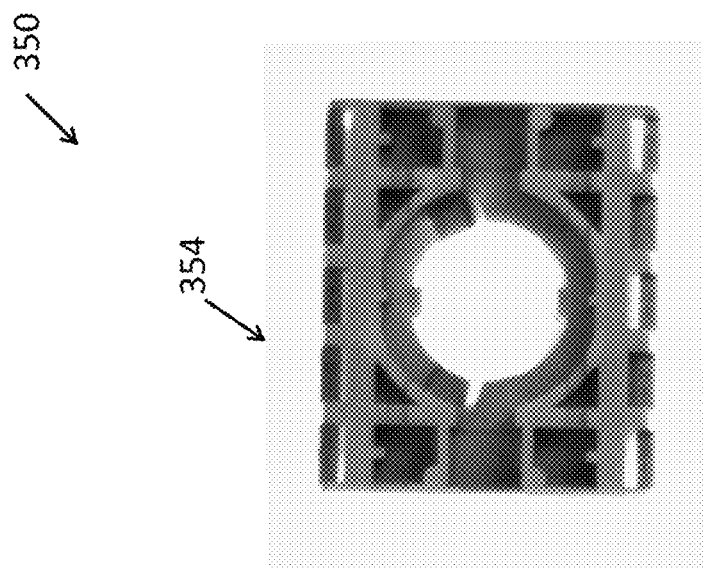
FIG. 3b shows exemplary fields of view of a work piece in a machine vision system.
Figure 3B:
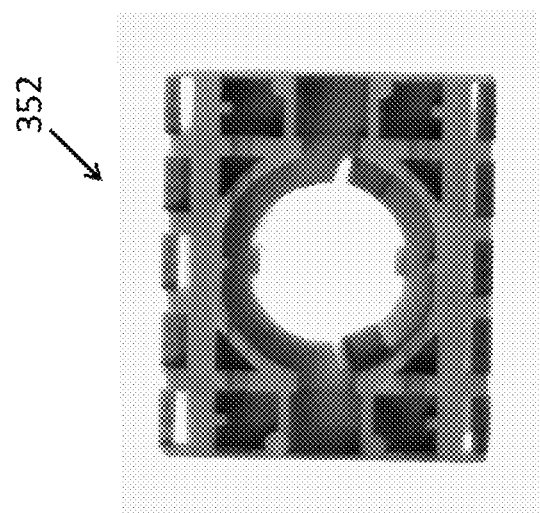

Being able to extract differentiating features can be important to solving a common problem in machine vision systems. Some objects can be almost symmetric under rotation, however, some applications would require the ability to discriminate reliably between different poses. This is illustrated in FIG. 3b, which shows, generally at 350, images of two objects (352 and 354). It is clear that the two images correspond to the same object. However, the object is captured in two different poses, and therefore, the two images show a small set of differentiating features.

According to aspects of the disclosure, the disclosed systems and methods extract differentiating features of similar objects. Specifically, the disclosed system utilizes separate sets (classes) of training images, where each set contains instances of a common view of a part. For example, in the shunt-ring case discussed above in connection with FIG. 2, there are two sets (classes), one set that contains images of the top-view and another set other that contains images of the bottom-view. The disclosed system can first train a collection of models. At run-time these models can be used, for example, to generate accurate alignments and also classifications of found instances of the work piece.

Figure 4:
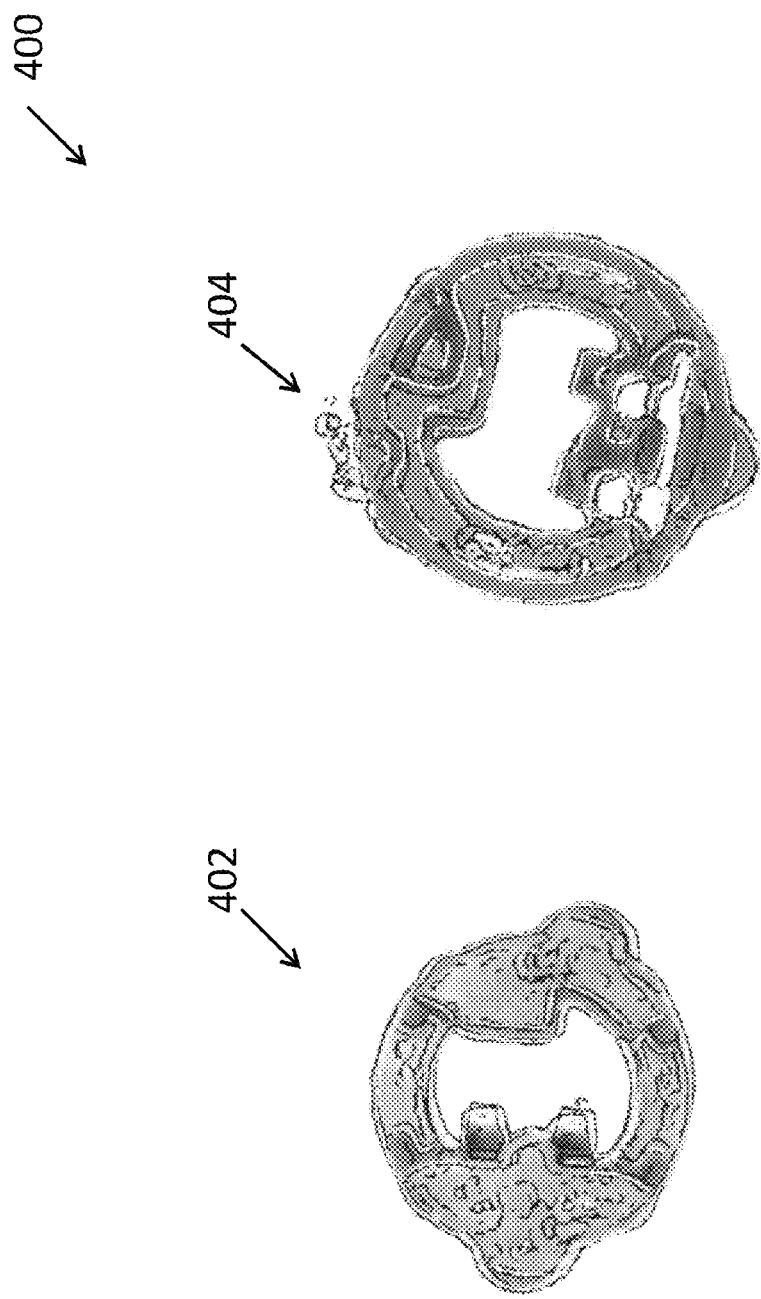
FIG. 4 shows exemplary common features among training images of the same set and among training images of different sets, in accordance with some embodiments.

According to aspects of the present disclosure, a first step of the training process can include generating common features from individual sets of training data. For example, methods for generating common features are described in U.S. Pat. No. 8,315,457, entitled "System and Method for Performing Multi-image Training for Pattern Recognition and Registration," which is hereby incorporated by reference herein in its entirety. In the case of the shunt rings of FIG. 2, there are two sets of training images as discussed above. FIG. 4 shows exemplary common features among training images of the same set and among training images of different sets, in accordance with some embodiments. FIG. 4 generally at 400 illustrates the common features. Specifically, image 402 is a view of the top side of the shunt ring and image 404 is a view of the bottom side of the shunt ring. Image 402 can correspond to a baseline image of the first training set and image 404 can correspond to a baseline image of the second training set. Each individual set of training images can have common features among the images within the training set. In addition, the training images of one set can have common features with the training images of the second set. For example, in FIG. 4, the features from the individual training images showing the top side of the shunt ring (402) that are common among the training images of the set are shown with a black line overlaid on the image 402 of the shunt ring. Similarly, the features from the individual training images showing the bottom side of the shunt ring (404) that are common among the training images of the set are also shown with a black line overlaid on the image 404 of the shunt ring. However, as discussed above the two training sets have common features between them. The common features for each set of training images are shown in the images of FIG. 4 with a white line overlaid on both images. According to some embodiments, the differentiating features between the two sets of training images can correspond to the features that are different between the common features of each set, for example, differences between the features shown in white lines in images 402 and 404.

According to aspects of the present disclosure, two composite models can be trained from the common features. A composite model as used herein can correspond to a model comprising common features found in a plurality of training images. These composite models can be used in the runtime process, as discussed below. Next, the system can use the common features to extract features that are unique to each model. For example, this can be accomplished by corresponding the common features corresponded to a baseline image and the features that cannot be corresponded to the baseline image, e.g., the unique features, can be added to the differential model.

Figure 5:
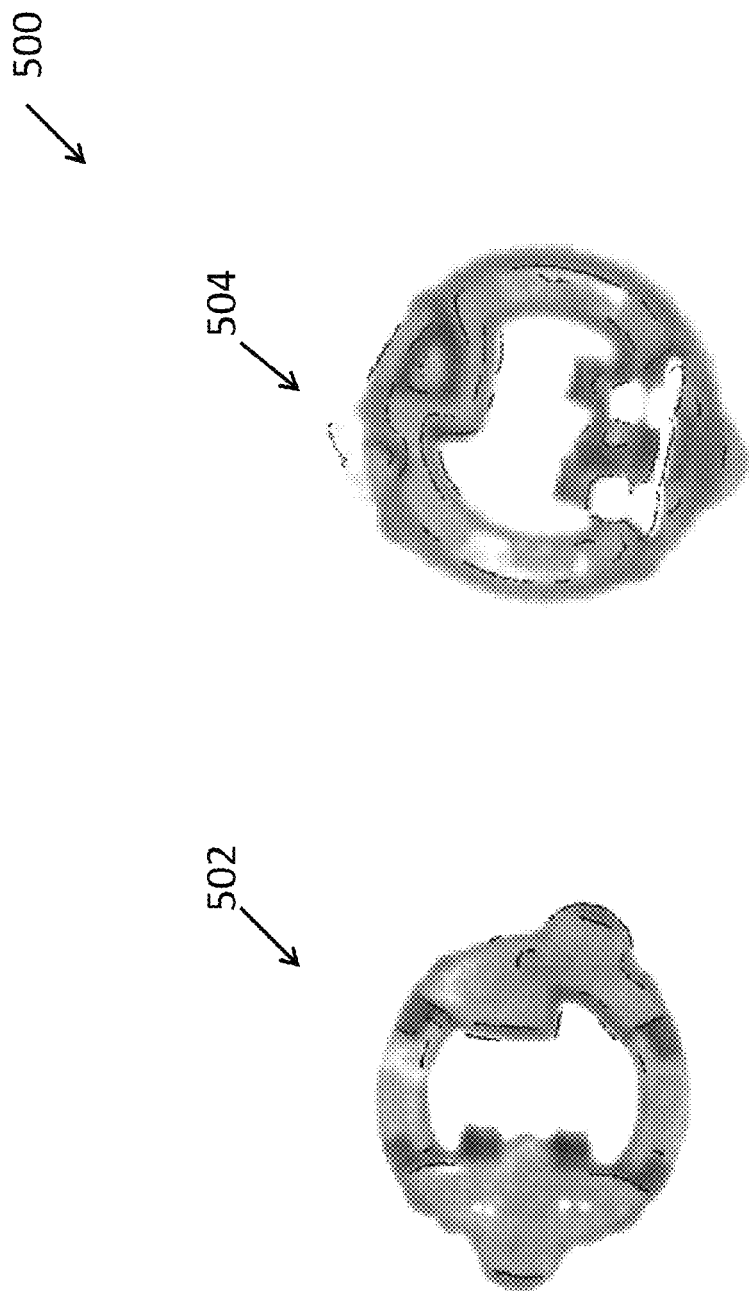
FIG. 5 shows exemplary differentiating features among training images of different sets, in accordance with some embodiments.

This is illustrated in FIG. 5, which shows exemplary differentiating features among training images of different sets, in accordance with some embodiments. FIG. 5 generally at 500 shows two baseline images for the two sets of training data: one image corresponding to the top side of the shunt ring 502 and another image corresponding to the bottom side on the shunt ring 504. Under aspects of the present disclosure, the machine vision system can compare the features of the two composite models. Features of one model that do not correspond to any features in the other model are considered unique to that model and comprise the differentiating features of that model. The differentiating features that correspond to the first and second composite models are illustrated in 502 and 504, respectively, as black lines overlaid over the baseline models. A person of ordinary skill would understand that other methods can be used to generate the differentiating features.

Figure 6A:
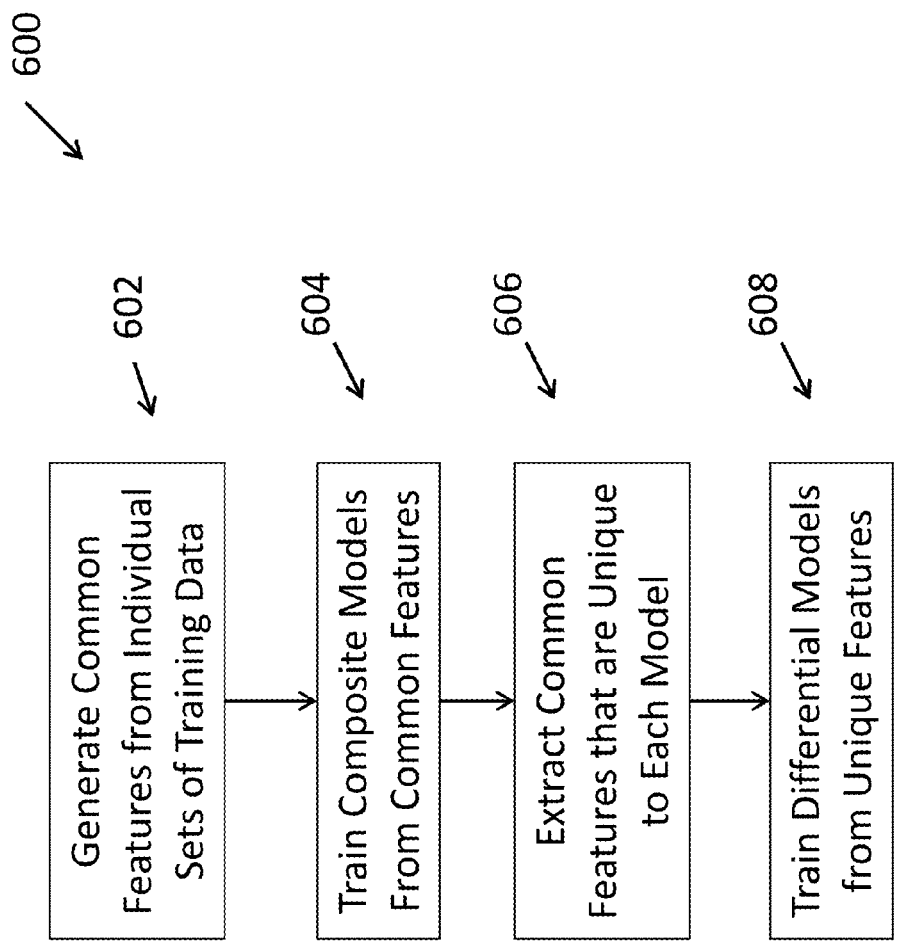
FIG. 6a shows an exemplary training process, in accordance with some embodiments.

Based on the discussion above, a training process according to aspects of the disclosure is illustrated in FIG. 6a. First the process can generate common features from individual sets of training data (step 602). Based on the common features, the method can train composite models (step 604). Then the method can extract the common features that are unique to each model (step 606) that was trained in step 602. Based on these unique features, e.g., the differentiating features, the process can train differential models (step 608).

Figure 6B:
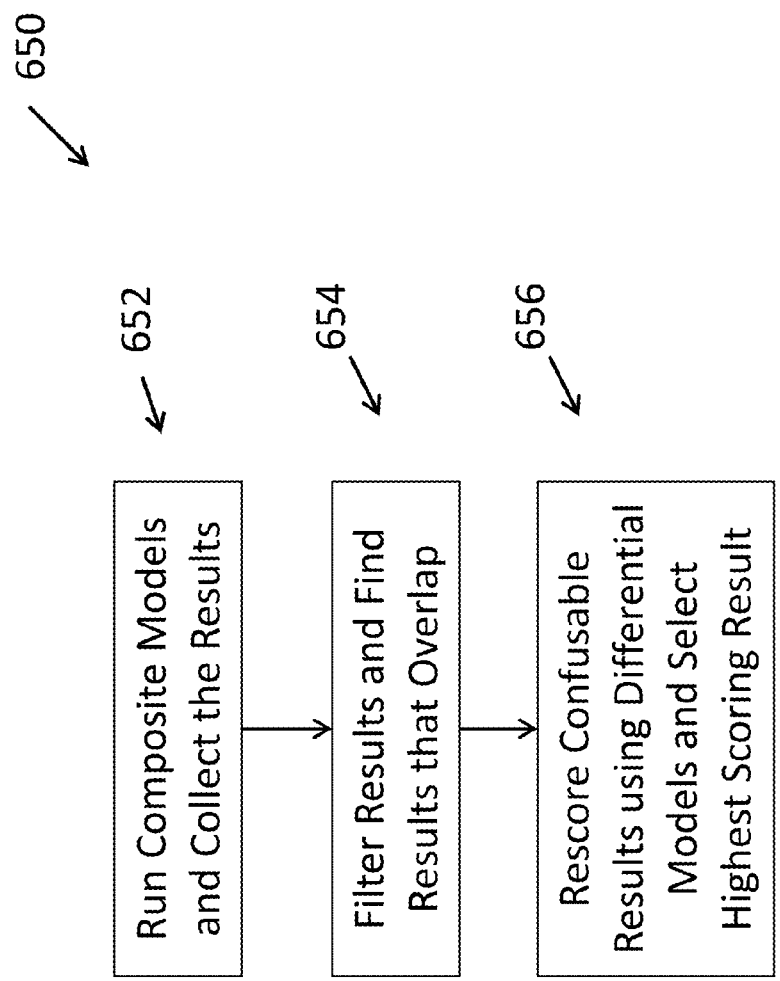
FIG. 6b shows an exemplary runtime process, in accordance with some embodiments.

According to aspects of the disclosure, a runtime process 600 can comprise three steps, as illustrated in FIG. 6b. First, the process can run the two composite models and collect the results (step 652). This is often desirable, when an accurate alignment is required. Second, the process can filter the results and find those that overlap and can be sufficiently close in score to be deemed confusable (step 654). Overlapping results can be identified, for example, according to the methods described in U.S. Pat. No. 7,016,539, the contents of which are incorporated herein in their entirety. Third, the process can rescore the confusable results using the differential models and can select the highest scoring model's result (step 656). For example, if there are two trained patterns, e.g. a 'B' and an '8,' there are two corresponding composite models one for each pattern, and two differential models, one trained from the features of the 'B' pattern not found in the '8' pattern, and one trained from features in the '8' patent but not found in the 'B'. The process can run both the composite models to find an alignment of the patterns in the run-time image. If both models align to an overlapping region and their scores are close, there can be an uncertainty whether there is an '8' or 'B' at the found location. The process can then run the differential models to generate scores at each of the aligned positions. Details about the differential models can be found in U.S. Pat. No. 7,016,539 and U.S. Pat. No. 6,658,145, the contents of which are incorporated herein in their entirety.

According to aspects of the present disclosure, the disclosed system can train a model based on more than two sets of training data, by training differential models for each pair of training data sets. For example, in an object character recognition system where '8', 'B' and '6' were found to be confusable, the disclosed system could train the following differential models: 8-B, B-6 and 8-6. This approach is desirable because as more sets are added, the number of features that are unique to each of these sets will eventually fall to a number small enough to preclude the training of a model. For example, although there might be sufficient features to train an 8-B differential model, there may not be enough to train an 8-B6 (i.e. a model containing features that occur in an '8' but not in a 'B' or a '6').

When a model is based on more than two sets of training data, during runtime, the first and second steps would be as described above; however the third step could use extra logic to handle an unlikely situation where the differential models scored such that 8 scored greater than 6, 6 scored greater than B, but B scored greater than 8. According to alternative aspects of the disclosure, the system can train a classifier, for example, a support vector machine, to minimize the classifier's error rate. The classifier's inputs can be the scores of the various differential models and the output can be the likelihood for each model. The classifier can be trained to minimize error rate, and as part of the training can learn to weight each of the inputs differently.

To evaluate the results of the disclosed classification and alignment methods two composite models were trained, a first model corresponding to a top view of an object and a second model corresponding to the bottom view of the same object, a shunt ring. These two models were run over a test set. For each instance, the score difference between the correct model and the incorrect model was recorded. The table shows the minimum score difference and the mean score difference for each of the two classes, corresponding to the top view and the bottom view. At each location, the difference in score between the correct model and the wrong model was calculated using their best alignments across the test set.

TABLE 1

Score differences using only composite models

| class | Top view | Bottom view |
|---|---|---|
| minimum | 0.061 | 0.151 |
| mean | 0.171 | 0.238 |

Figure 7A:
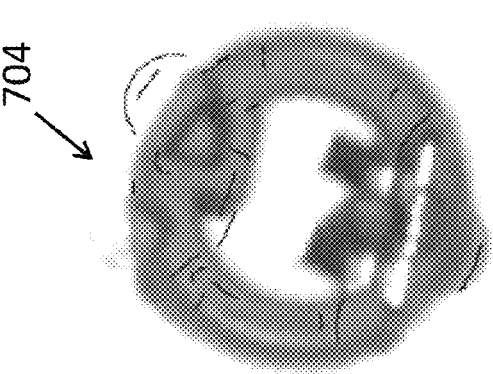
FIG. 7a shows exemplary differentiating features among training images of different sets after the features have been aligned and shown against a top view image of an object, in accordance with some embodiments.
Figure 7A:
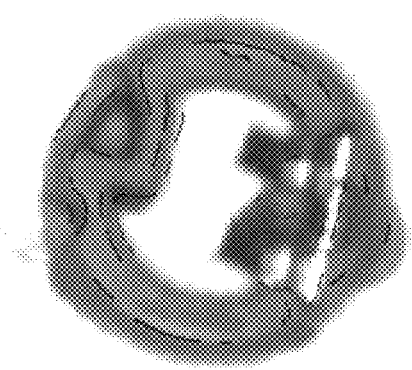

The same test set is used to get the results presented in Table 2 below, but the composite models were only used to obtain the alignments for each instance. The reported scores are from the differential models and, as illustrated below, show the increased ability for the machine vision system to discriminate between top and bottom views. FIG. 7a shows the differential models used to obtain the results in Table 2. Specifically, FIG. 7a, generally at 700, shows the differentiating features in black lines among training images of different sets after the features have been aligned and shown against a top view image of an object. The images show the differential model features of the top view 702 and bottom view 704 of the object, which are the same features as shown in FIG. 5, but in this case both are aligned and shown against an image showing the top view. This demonstrates that the features of the model trained on bottom view do not coincide with any features in the top view. Table 2 shows the score differences using the differential models. The table illustrates significant improvement in the scores compared to the scores reported in Table 1.

TABLE 2

Score differences using differential models

| class | Top view | Bottom view |
|---|---|---|
| minimum | 0.242 | 0.423 |
| mean | 0.751 | 0.654 |

Figure 7B:
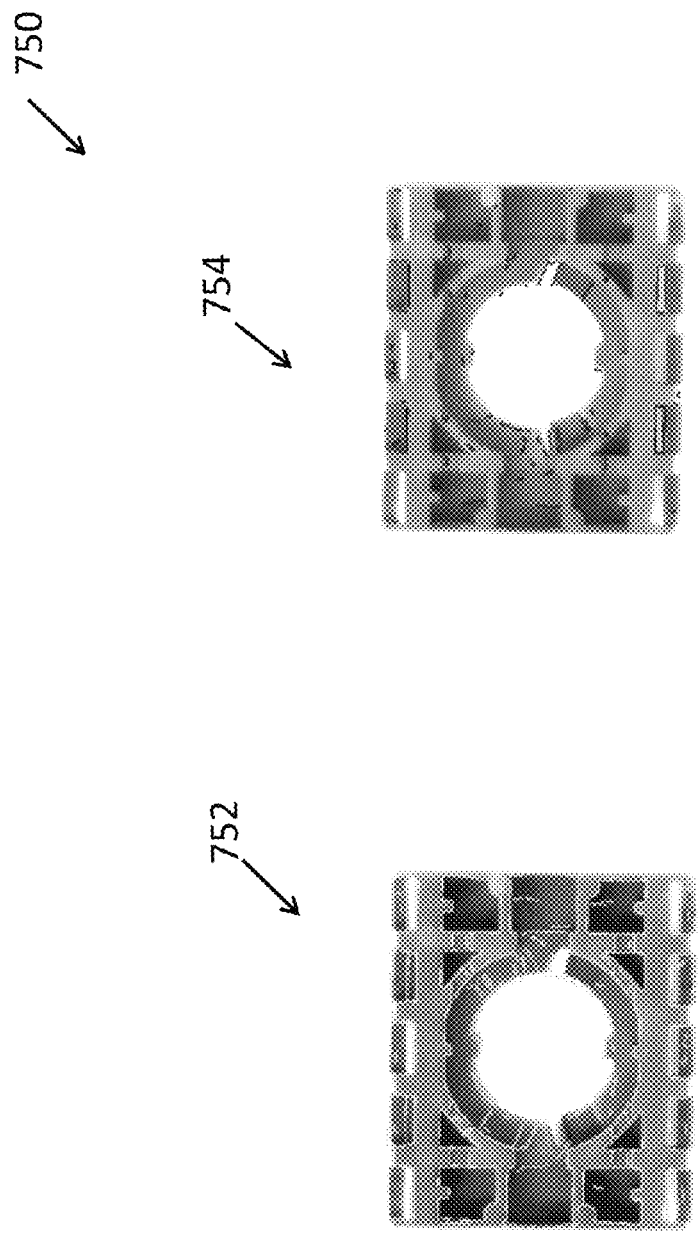
FIG. 7b shows exemplary features aligned at a rotation of 180 degrees and differentiating features for a model in different orientations, in accordance with some embodiments.

Referring to FIG. 3b, the two objects (352 and 354) appear rotationally symmetric, without being though. Typical training systems can have difficulties orientating objects that are very close to rotationally symmetric. FIG. 7b, generally at 750 shows the common and differentiating features between the two objects 352 and 354. Specifically, object 354 is rotated 180° and the system identifies the common features, which are illustrated by white lines (752). This demonstrates how the pattern is self-similar under a rotation of 180 degrees. In addition, the system identifies the differentiating features between objects 352 and 354, i.e., an object orientated at 0 and 180 degrees, which are illustrated by black lines (754).

According to aspects of the disclosure, the training process can include training an initial model, for example, a pattern trained from an image region in an arbitrary coordinate system, from a first training image. The process can use the initial model to obtain alignments against a set of further training images, for example, images showing an approximate pose with angle within +/−45 degrees. In addition, the process can build a composite model that can be used at runtime to perform alignment. Then the method can run the trained composite model against one or more of the training images to find the highest scoring incorrect result, for example, the highest scoring incorrect location. The particular image with the highest scoring incorrect result can be used as confusion pose.

The confusion pose can be used to train a pair of differential models "correct-location from incorrect-location" and "incorrect-location from correct-location." These differential models can be used at run-time to verify that a found pose is truly of the desired model, i.e. is not a match to the highest scoring incorrect location as found in the training data set. Specifically, the process can apply the confusion pose to each of the training images and extract the resulting image regions from those training images that fall at the confusion pose. Finally, the method can train a pair of differential models based on the differential features of the correct (or original model) and this new 'confusion' model. The runtime process can run the original composite model, trained at the correct location, and use the differential models to verify that the returned poses refer to an instance of the original trained pattern and not the confusion pattern.

According to alternative embodiments, the confusion region can actually contain the same pixel data, but the orientation can be reversed by 180 degrees. Therefore, in this case there can only be one composite model trained at the original pose. To identify the features for the differential model, the features from the original model can be used for the first set of features used for differential model training, and the same features rotated by 180 degrees can be used for the second set.

Table 3 below shows the score differences between the correctly aligned result and the inverted pose result, e.g., rotated 180 degrees. One thing to note when examining these scores is the feature geometry in these images exhibit a great deal of variance due to differences in lighting direction causing changes in internal shadows and illumination. Specifically, Table 3 shows the minimum and mean score differences for the "Alignment Model," which correspond to the difference in scores between the correct pose and that at 180 degrees for the originally trained composite model used for alignment, and for the "Differential Model," which corresponds to the difference in scores between the two differential models, the one trained on 0-from-180 degrees and 180-from-0 degrees.

TABLE 3

Score differences between correctly aligned result and rotated result

| Scoring model | Alignment model | Differential model |
| --- | --- | --- |
| Minimum score difference | 0.026 | 0.116 |
| Mean score difference | 0.082 | 0.367 |

Figure 8:
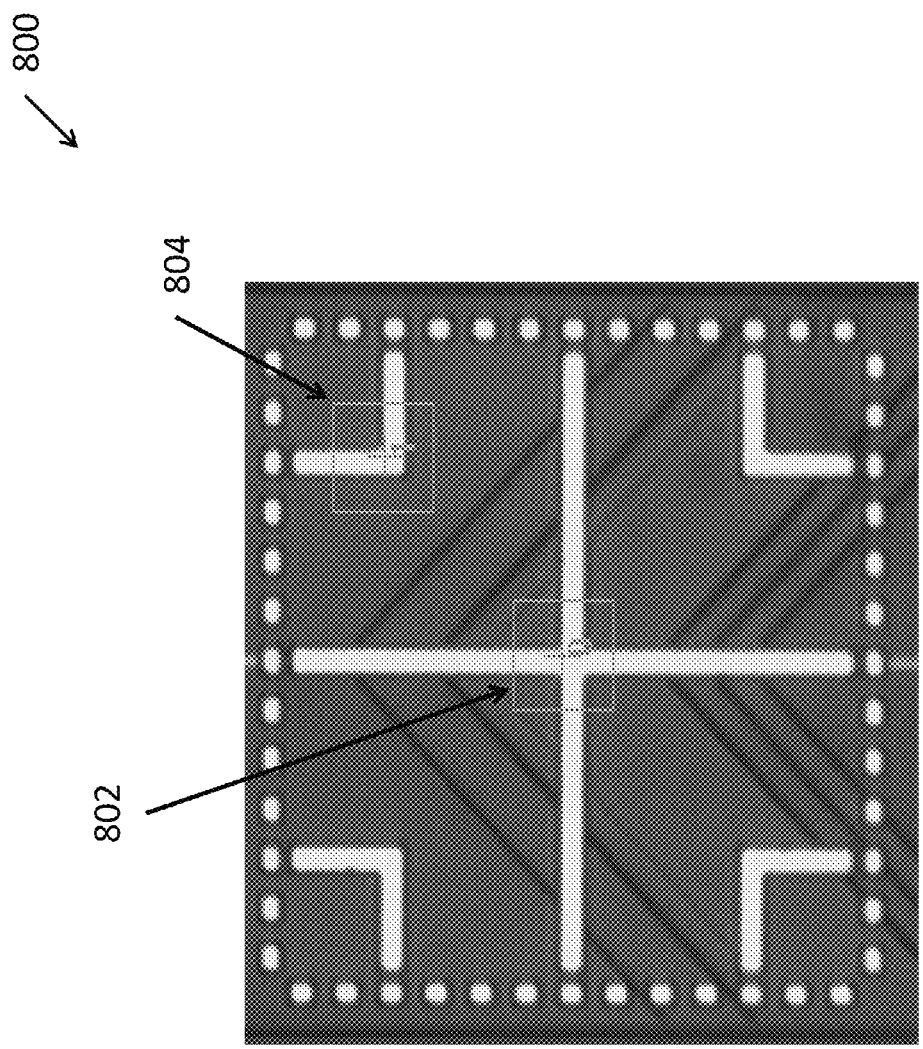
FIG. 8 shows an example of misalignment of features by a vision system.

According to aspects of the disclosure, the systems and methods can have applications to similar regions in training images. For example, a fiducial can sometimes score highly at incorrect positions in a training image. The differential model can be used to filter out the results at run-time. This is illustrated in FIG. 8, which shows, generally at 800, the returned alignments using a model trained on a cross. The instance marked "0" (802) is the correct location of a cross. The instance marked "1" (804) is the confusion location. The "cross" model can be misaligned by a vision system because the arms of the cross have similar width to other features found in the image.

Figure 9B:
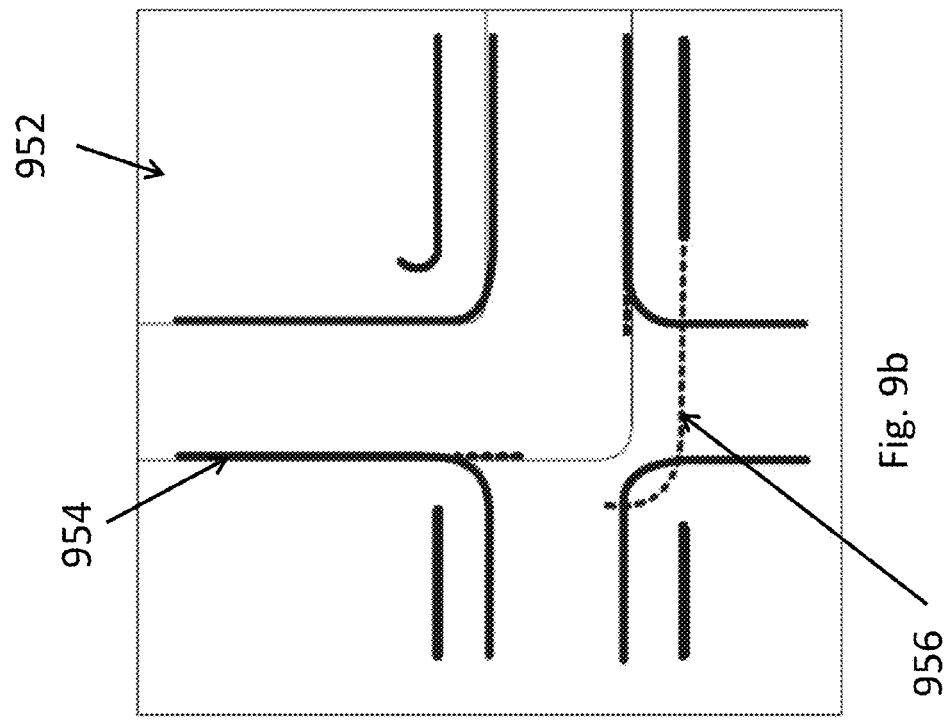
FIG. 9b shows exemplary features of an original model and the differentiating features of a confusion model, in accordance with some embodiments.
Figure 9A:
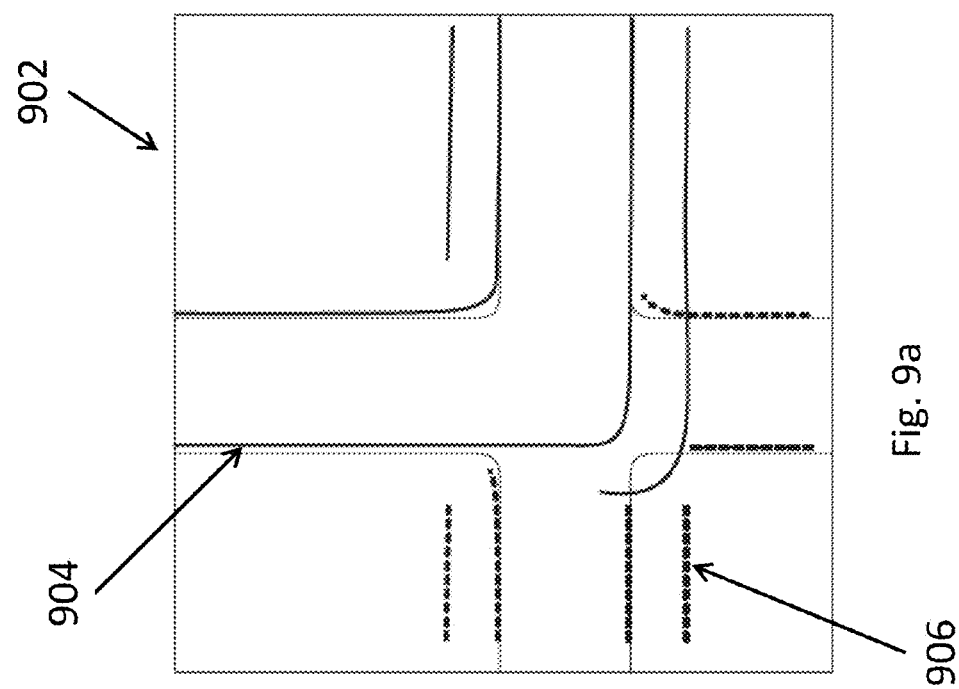
FIG. 9a shows exemplary features of a confusion model and exemplary differentiating features of an original model, in accordance with some embodiments.

FIG. 9a, generally at 902, shows the features of the confusion model in solid lines 904 aligned at the original site, and the differentiating features of the original model in dashed lines 906.

FIG. 9b, generally at 952, shows the features of the original model in solid lines 954, misaligned at the confusion site, and the differentiating features of the confusion model in dashed lines 956.

The training procedure for identifying incorrect positions in training images can include, for example, training an initial model from a first training image, and using the initial model to obtain alignments against a set of further training images, for example, with approximate poses with an angle that can be within +/−45 degrees. Then the training procedure can build a composite model that can be used at runtime to perform alignment. The training procedure can also include running the trained composite model against one or more of the training images to find the highest scoring incorrect result. The corresponding pose can be used as confusion pose. The confusion pose and the set of training images can be used to extract the composite features for the region identified by the confusion pose. Then the process can construct a set of differential features by comparing those used to train the composite model with the features extracted in the previous step. Finally, the training process can train a differential model based on the differential features.

Table 4 below shows the score differences between the correctly aligned result and the highest scoring incorrect result. Specifically, Table 4 shows the minimum and mean score differences for the "Alignment Model," which correspond to the difference in scores between the correct pose and that at the confusion pose for the originally trained composite model used for alignment, and for the "Differential Model," which corresponds to the difference in scores between the cross-from-corner and corner-from-cross differential models. In the case of the differential model, no incorrect results were found and the correct scores were very high.

TABLE 4

Score differences between correctly aligned result and highest scoring incorrect result.

| Scoring model | Alignment model | Differential model |
| --- | --- | --- |
| Minimum score difference | 0.311 | 0.999 |
| Mean score difference | 0.328 | 0.999 |

The differential models in the above experiments were scored with clutter turned off. Clutter is generated when extra unexpected features, e.g., features not in the trained model, are found in the aligned model's location at runtime. The run-time scoring algorithm can either ignore clutter or count clutter against the final score. To turn on clutter scoring in the differential model, the image features that were corresponded with alignment features that were not also differential features would have to be ignored in the scoring algorithm.

Figure 10:
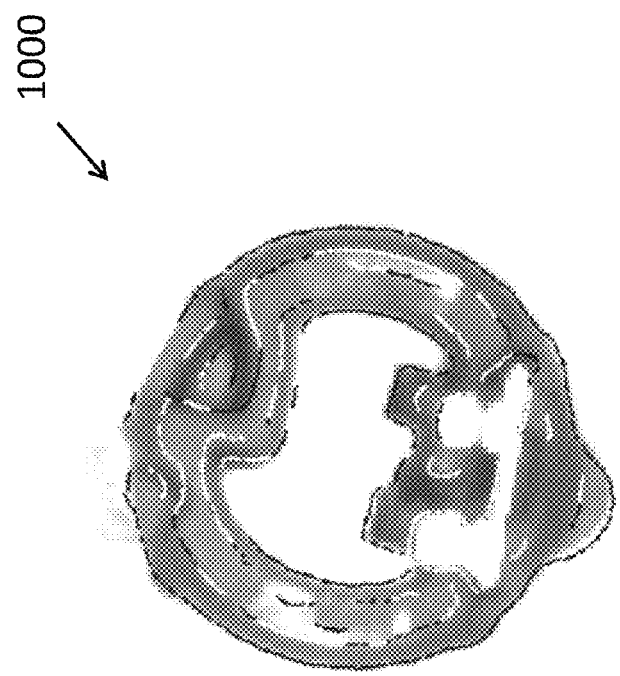
FIG. 10 shows aligned features on an object based on an exemplary scoring algorithm, in accordance with some embodiments.

FIG. 10 shows the results of the scoring algorithm used in conjunction with the differential model. The features aligned correctly with the differential model are shown in white. The features shown in black correspond to the alignment of the composite model of the top view of the shunt. These are the features that are also considered similar to those of the bottom view. When scoring the differential model, it is important to not count run-time features that correspond to these trained features as clutter, they should simply be ignored. For example, in the image shown in FIG. 10 any feature corresponded with the black alignment-model-only features would be ignored by the scoring algorithm and not considered clutter.

Under typical scoring methodologies, trained features found at run-time count positively towards the score, trained-features missing in the run-time image count negatively towards the score, and extra unexpected run-time features, i.e., clutter, also count negatively towards the score. According to aspects of the disclosure, instead of building and running two differential models, the proposed methods can construct a single differential model with the features that differentiate the correct pose from the confusion pose weighted positively. The disclosed method can then add the features from the confusion threshold to the same model, but these would be weighted negatively. At run-time the features for the correct pose can count positively towards the score, the missing features can count negatively, and clutter can also count negatively. According to alternative aspects, the features from the confusion model would count more negatively than clutter towards the score.

Figure 11:
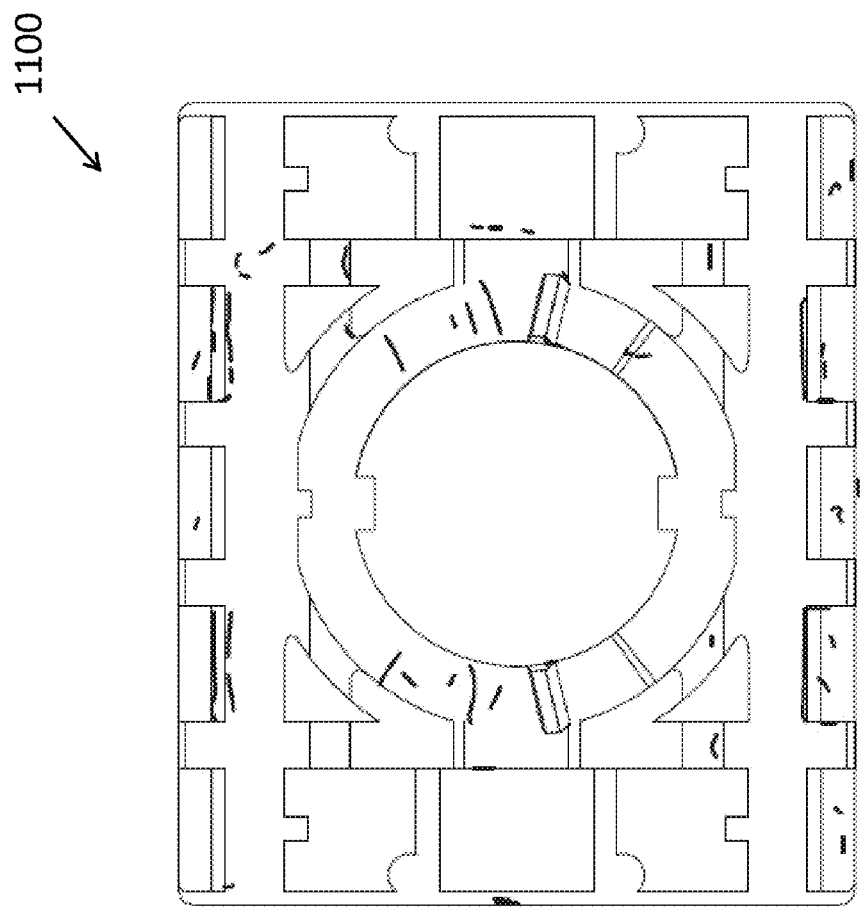
FIG. 11 shows misaligned features on an object based on an exemplary scoring algorithm, in accordance with some embodiments.

FIG. 11 shows misaligned differentiating features based on an exemplary scoring algorithm. If run-time features are located in these locations then the scoring algorithm might assign them a heavy penalty (i.e. above and beyond considering them clutter). For example any features that were corresponded with incorrectly aligned differential features, shown as thick black lines in FIG. 11 (1100) would be penalized to a greater extent than clutter.

According to alternative aspects, another possibility would be to train a classifier based on the differentiating features, for example a support vector machine.

The system and methods described herein can have various applications, so some non-limiting examples are described below for illustrative purposes. For example, some applications can include identifying a gear missing a tooth and further identifying an orientation of the gear missing a tooth. Another application can include a training image where a region is selected to be a model. A large training image can be, for example, an image of a wafer, and a target can be an identifier, for example, a small cross in the wafer that is unique but very similar to other crosses. Since the wafer has many crosses that are similar, the model could identify a lot of crosses, because it would be trained to identify crosses. The disclosed systems and methods can be used to differentiate the target cross from the false positives since otherwise an instance of a pattern can be incorrectly confused with something else.

FIG. 12 shows an exemplary method 1200 for a machine vision system to create geometric models, according to aspects of the disclosure. The method can include obtaining a first set of training images of a first work piece and a second set of training images of a second work piece 1202, selecting at least one training image from one of the first set of training images and the second set of training images as an at least one baseline image 1204, and training at least one baseline alignment model from the least one the baseline image 1206. The method can also include registering the training images in the first set of training images not selected as the at least one baseline image using the at least one baseline alignment model to obtain a first set of relatives poses to the at least one baseline image for each training image in the first set of training images 1208 and registering the training images in the second set of training images not selected as the at least one baseline image using the at least one baseline alignment model to obtain a second set of relatives poses to the at least one baseline image for each training image in the second set of training images 1210. The method can also include identifying first corresponding features from the first set of training images, the second corresponding features from the second set of training images, and at least one shared feature among the first corresponding features and the second corresponding features 1212. The method can also include extracting one or more differentiating features from the first set of training images and the second set of training images based on the first, the second corresponding features, and the at least one shared feature among the first corresponding features and the second corresponding features, wherein the one or more differentiating features can be used to differentiate between the first work piece and the second work piece 1214, generating an alignment model using at least one of the first corresponding features, the second corresponding features, and the at least one shared feature 1216, and generating a classification model using the one or more differentiating features 1218.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A method for training a machine vision system to create geometric models, the method comprising the steps of:
    obtaining a first set of training images of a first work piece and a second set of training images of a second work piece;
    selecting at least one training image from one of the first set of training images and the second set of training images as an at least one baseline image;
    training at least one baseline alignment model from the least one the baseline image;
    registering the training images in the first set of training images not selected as the at least one baseline image using the at least one baseline alignment model to obtain a first set of relatives poses to the at least one baseline image for each training image in the first set of training images;
    registering the training images in the second set of training images not selected as the at least one baseline image using the at least one baseline alignment model to obtain a second set of relatives poses to the at least one baseline image for each training image in the second set of training images;
    identifying first corresponding features from the first set of training images;
    identifying second corresponding features from the second set of training images;
    identifying at least one shared feature among the first corresponding features and the second corresponding features;
    extracting one or more differentiating features from the first set of training images and the second set of training images based on the first corresponding features, the second corresponding features, and the at least one shared feature among the first corresponding features and the second corresponding features, wherein the one or more differentiating features can be used to differentiate between the first work piece and the second work piece;
    generating an alignment model using at least one of the first corresponding features, the second corresponding features, and the at least one shared feature; and
    generating a classification model using the one or more differentiating features.

2. The method of claim 1, wherein the first corresponding features are stable between the training images in the first set and wherein the second corresponding features are stable between the training images in the second set.

3. The method of claim 2, wherein the first corresponding features and the second corresponding features are stable when identified in a number of training images greater than a threshold value.

4. The method of claim 1, wherein the first work piece is a work piece in a first pose and the second work piece is the work piece in a second pose.

5. The method of claim 1, wherein the first work piece is a different work piece than the second work piece.

6. The method of claim 1, wherein the first corresponding features comprise common features between the baseline image and the training images of the first set.

7. The method of claim 6, wherein the step of identifying the first corresponding features comprises:
    extracting features from the training images of the first set of training images;
    mapping the extracted features using the first set of relative poses; and
    applying to the mapped features a correspondence metric to identify the first corresponding features.

8. The method of claim 1, wherein the second corresponding features comprise common features between the baseline image and the training images of the second set.

9. The method of claim 8, wherein the step of identifying the second corresponding features comprises:
    extracting features from the training images of the second set of training images;
    mapping the extracted features using the second set of relative poses; and
    applying to the mapped features a correspondence metric to identify the second corresponding features.

10. The method of claim 1, wherein the step of identifying at least one shared feature comprises:
    mapping the first corresponding features and the second corresponding features; and
    applying to the mapped features a correspondence metric to identify the at least one shared feature.

11. The method of claim 1, wherein the at least one baseline image comprises a first baseline image from the first set of training images and a second baseline image from the second set of training images.

12. The method of claim 11, wherein the step of training at least one baseline alignment model comprises:
    training a first baseline alignment model from the first baseline image; and
    training a second baseline alignment model from the second baseline image.

13. The method of claim 12, wherein the step of registering the training images in the first set of training images comprises registering the training images in the first set of training images not selected as the first baseline image using the first baseline alignment model to obtain a first set of relatives poses to the first baseline image for each training image in the first set of training images.

14. The method of claim 12, wherein the step of registering the training images in the second set of training images comprises registering the training images in the second set of training images not selected as the second baseline image using the second baseline alignment model to obtain a second set of relatives poses to the second baseline image for each training image in the second set of training images.

15. A method for training a machine vision system to create geometric models, the method comprising the steps of:
    obtaining a set of training images depicting a pattern;
    training a baseline alignment model from a first training image of the set of training images;
    registering training images of the set of training images other than the first training image to obtain a first set of relative poses among the training images using the alignment model;
    identifying common features from the training images by extracting features from each of the training images, mapping the extracted features using the first set of relative poses and applying to the mapped features a correspondence metric;
    generating an alignment model for the pattern using a first subset of the common features derived from a first set of training images that fall in a first region of the pattern;
    identifying a second region within the training images;
    identifying a second subset of common features derived from a second set of training images that fall in the second region;
    extracting one or more differentiating features from the first subset of common features and the second subset of common features, wherein the one or more differentiating features can be used to differentiate between a region containing a fiducial and the second region; and
    generating a classification model from the one or more differentiating features.

16. The method of claim 15, wherein the step of identifying the second region comprises running the alignment model for the pattern over the training images and identifying a region where the alignment model for the pattern scores highly but the region does not contain an instance of the pattern.

17. A system for training a machine vision system to create geometric models comprising:
    a camera configured to capture images; and
    a processor in communication with the camera configured to:
        obtain a first set of training images of a first work piece and a second set of training images of a second work piece;
        select at least one training image from one of the first set of training images and the second set of training images as an at least one baseline image;
        train at least one baseline alignment model from the least one the baseline image;
        register the training images in the first set of training images not selected as the at least one baseline image using the at least one baseline alignment model to obtain a first set of relatives poses to the at least one baseline image for each training image in the first set of training images;
        register the training images in the second set of training images not selected as the at least one baseline image using the at least one baseline alignment model to obtain a second set of relatives poses to the at least one baseline image for each training image in the second set of training images;
        identify first corresponding features from the first set of training images;
        identify second corresponding features from the second set of training images;
        identify at least one shared feature among the first corresponding features and the second corresponding features;
        extract one or more differentiating features from the first set of training images and the second set of training images based on the first corresponding features, the second corresponding features, and the at least one shared feature among the first corresponding features and the second corresponding features, wherein the one or more differentiating features can be used to differentiate between the first work piece and the second work piece;
        generate an alignment model using at least one of the first corresponding features, the second corresponding features, and the at least one shared feature; and
        generate a classification model using the one or more differentiating features.

18. A system for training a machine vision system to create geometric models comprising:
    a camera configured to capture images; and
    a processor in communication with the camera configured to:
        obtain a set of training images depicting a pattern;
        train a baseline alignment model from a first training image of the set of training images;
        register training images of the set of training images other than the first training image to obtain a first set of relative poses among the training images using the alignment model;
        identify common features from the training images by extracting features from each of the training images, mapping the extracted features using the first set of relative poses and applying to the mapped features a correspondence metric;
        generate an alignment model for the pattern using a first subset of the common features derived from a first set of training images that fall in a first region of the pattern;
        identify a second region within the training images;
        identify a second subset of common features derived from a second set of training images that fall in the second region;
        extract one or more differentiating features from the first subset of common features and the second subset of common features, wherein the one or more differentiating features can be used to differentiate between a region containing a fiducial and the second region; and
        generate a classification model from the one or more differentiating features.

* * * * *